(12) United States Patent  
Spurgeon

(10) Patent No.: US 6,457,275 B1  
(45) Date of Patent: Oct. 1, 2002

(54) ELECTRONIC FISHING LURE

(75) Inventor: Cecil R. Spurgeon, Richmond, CA (US)

(73) Assignee: Pro-Troll, Inc., Concord, CA (US)

( * ) Notice: Subject to any disclaimer, the term of this patent is extended or adjusted under 35 U.S.C. 154(b) by 0 days.

(21) Appl. No.: 09/705,345

(22) Filed: Nov. 2, 2000

(51) Int. Cl.⁷ ............................................. A01K 85/01
(52) U.S. Cl. ................. 43/17.1; 43/42.45; 43/42.5
(58) Field of Search .................. 42/31; 43/17.1, 43/17.5, 17.6, 26.2, 42.25; 307/118; 310/320, 321; 367/152, 162, 176; 429/7, 8, 96, 98, 118, 119, 128, 130, 140, 146

(56) References Cited

U.S. PATENT DOCUMENTS

| | | | | |
|---|---|---|---|---|
| 4,347,681 A | * | 9/1982 | Fima | 43/17.6 |
| 4,970,808 A | * | 11/1990 | Massie | 43/17.1 |
| 5,159,773 A | * | 11/1992 | Gentry et al. | 43/17.1 |
| 5,903,999 A |   | 5/1999 | Petras | 43/17.6 |

OTHER PUBLICATIONS

U.S. Patent Extract 5495690.
Internet IBM U.S. Patent Extract 4227331.
Internet IBM U.S. Patent Extract 4583313.
Internet IBM U.S. Patent Extract 5159773.

* cited by examiner

*Primary Examiner*—Peter M. Poon
*Assistant Examiner*—Bret Hayes
(74) *Attorney, Agent, or Firm*—Bruce & McCoy; Ernest H. McCoy

(57) ABSTRACT

An apparatus and method for attracting fish by means of electronic fishing lure having a steel ball enclosed in a metal tube and having a piezoelectric crystal enclosed therewith as one end thereof which generates an electric voltage that is transmitted to the surrounding water when the ball strikes an end of the tube as a result of the motion of the lure in the water oscillating the tube.

12 Claims, 3 Drawing Sheets

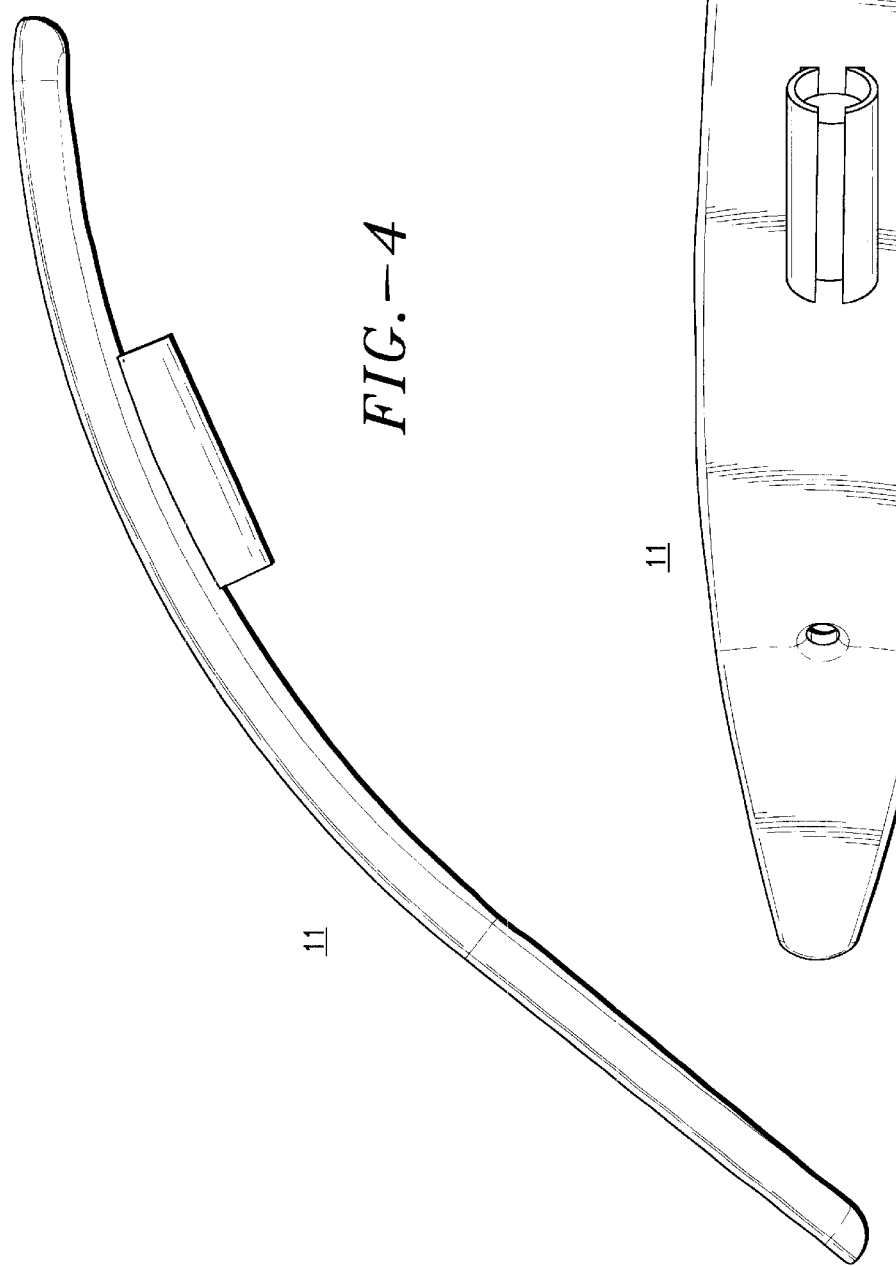

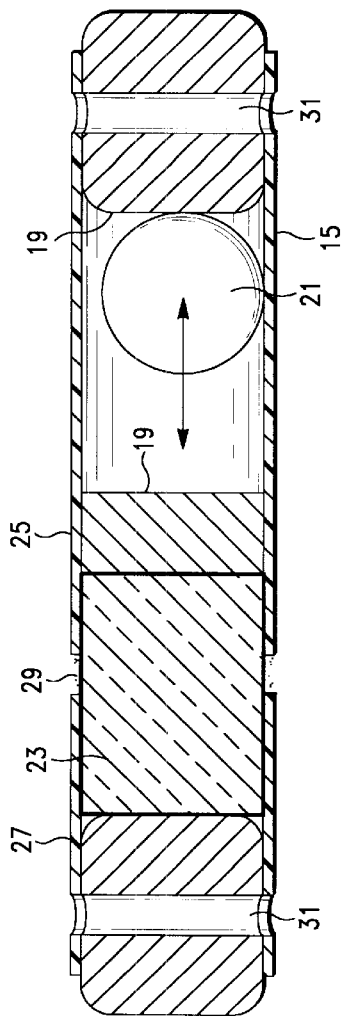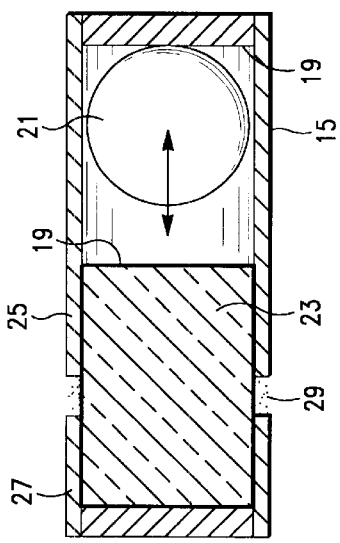

ELECTRONIC FISHING LURE

BACKGROUND OF THE INVENTION

1. Field of the Invention

The present invention relates to artificial fishing lures. More particularly, it relates to fish attracting lures employing electricity to enhance the attractiveness of the lure to fish. Still more particularly, it relates to an electronically enhanced fishing lure which creates an alternating electric field in the vicinity of the lure.

2. Description of the Prior Art

The use of electricity in one manner or another for the purpose of enhancing the attractiveness of fishing lures to fish is known in the prior art. However, despite the numerous designs, forms, and arrangements, disclosed by the prior art which have been developed for the accomplishment of various objectives, purposes, and requirements, electrically activated fishing lures heretofor devised and utilized consist basically of familiar, expected, and obvious configurations, structural forms, and arrangements. This will become apparent from the following consideration of the closest known and relevant prior art.

A first type of electrically enhanced fishing lure is disclosed in U.S. Pat. No. 4,227,331 issued Oct. 14, 1980, to Ursrey et al. for a Fish Lure. The lure utilizes battery-powered light emitting diodes to attract fish.

Another type of electrically enhanced fishing lure is disclosed in U.S. Pat. No. 4,583,313 issued in Apr. 22, 1986, to Dugan for a Fishing Lure. The lure utilizes battery powered sound generators for emitting tones underwater to attract fish.

A further type of electrically enhanced fishing lure is disclosed in U.S. Pat. No. 5,159,773 issued in Nov. 3, 1992, to Scott et al. for an Electrified Fishing Lure. The lure utilizes a piezoelectric material in the body of the lure which is subjected to flexing which causes the material to produce an electromotive force which is connected to an LED for providing an illuminating effect to attract fish.

Yet another type of electrically enhanced fishing lure is disclosed in U.S. Pat. No. 5,495,690 issued Mar. 5, 1996, to Hunt for an Electronic Firefly Lure. A battery powered light source imitates the visual presentation of a firefly to attract fish.

And still a Per type electronically enhanced fishing lure is disclosed in U.S. Pat. No. 5,903,999 issued May 18, 1999, to Petras for an Electrolysis Fishing Lure. A fishing lure is provided with two body portions having different metals with the body portions being movable with respect to each other for generating an alternating current to attract fish.

Electrically enhanced fishing lures powered by batteries are unnecessarily heavy and subject to failure due to power depletion and short circuiting in the aqueous atmosphere. While the last prior art device considered above is formed for the purpose of creating an intermittent electric field surrounding a fishing lure for attracting fish, which is the subject of the present invention, the apparatus and method employed by the present invention depart from the conventional concepts and designs taught by the prior art. In doing o, the present invention provides a method and apparatus primarily developed for the purpose of attracting fish as described above, but it accomplishes the result in a different and improved manner for producing a moderately controllable and variable electrical voltage in the vicinity of the fishing lure.

SUMMARY OF THE INVENTION

In view of the foregoing described and other obvious disadvantages inherent in the known types of electrically activated fishing lures presently existing in the prior art, the present invention provides a new electrically activated fishing lure construction wherein the same can be utilized to attract fish while fishing with various types of lures.

The general purpose of the present invention, which will be described hereafter in greater detail, is to provide a new electronic fishing lure apparatus and method which have many of the advantages of the electrically activated fishing lures mentioned above. It also includes novel features that result in a new electronic fishing lure which is not anticipated, rendered obvious, suggested, or even implied by any of the prior art related to electrically activated fishing lures, either alone or in any combination thereof.

The present invention is an electric voltage generator for attachment to fishing lures for attracting fish. It is comprised a sealed rigid tube formed for containing a movable weight and having end wall formed for preventing movement of the weight beyond certain limits. The end walls are arranged to abruptly terminate longitudinal movement of the weight in the tube. A piezoelectric crystal is secured to the tube and electrically connected to the surrounding atmosphere. A free weight is disposed and contained in the tube and formed to move longitudinally therein whereby as the weight moves in the tube in response to movement thereof and strikes the end walls, the shock of any contact between the weight and the end walls is transmitted to the piezoelectric crystal and an electric voltage is generated and conducted to the surrounding atmosphere.

The more important features of the invention have been broadly outlined in order that the detailed description thereof which follows may be better understood and so that the present contribution to an improvement in the art may be better appreciated. There are additional features of the invention that will be described hereinafter and which will form the subject matter of the claims appended hereto.

With respect to the claims hereof, and before describing at least one preferred embodiment of the invention in detail, it is to be understood that the invention is not to be limited in its application to the details of construction and to the arrangements of the components which are set forth in the following description or illustrated in the drawings. The invention is capable of being created in other embodiments and of being practiced and carried out in various ways. Also, it is to be understood that the phraseology and terminology employed here are for the purpose of description and should not be regarded as limiting.

As such, those skilled in the art will appreciate that the conception upon which this disclosure is based, may readily be utilized as a basis for the designing of other forms, structures, methods, and systems for carrying out the several purposes of the present invention. It is important, therefore, that the claims be regarded as including such equivalent constructions in so far as hose constructions do not depart from the spirit and scope of the present invention.

Further, the purpose of the append ed abstract is to enable the United States Patent and Trademark Office, and the public generally, and especially designers, manufacturers, and practitioners of the art who are not familiar with the patent and legal terms or phraseology, to determine quickly from cursory inspection the nature and essence of the technical disclosure of the application. The abstract is neither intended to define the invention of the specification, which is measured by the claims, nor is it intended to be limiting as to the scope of the invention in any way.

OBJECTS OF THE INVENTION

It is therefore an important object of the present invention to provide a new and novel electronic fishing lure apparatus and method which has many of the advantages of the electrically activated fishing lures mentioned heretofor as well as many novel features that result in a new electronic fishing lure.

It is another object of the present invention to provide an electronic fishing lure which generates an electric voltage field intermittently in the vicinity surrounding a fishing lure.

It is a further object of the present invention to provide a fishing lure which generates its own electrical voltage from the motion of the lure without batteries by being towed through water or manipulated by the fishing line.

It is still another object of the preset invention to provide an electric voltage generator which can produce an intermittent or alternating electric field in the vicinity of a fishing lure in which the voltage can be varied by manipulating the fishing line.

And it is yet a further object of the present invention to provide a new and novel method for attracting fish by providing an attachment for a fishing lure or line which can be manipulated to create an alternating voltage intermittently in the vicinity of a fishing lure.

Other objects and advantages of the present invention will become apparent when the method and apparatus of the present invention are considered in conjunction with the accompanying drawings.

DESCRIPTION OF THE DRAWINGS

FIG. 3 is a top plan view thereof;

FIG. 4 is a side elevation view thereof;

FIG. 5 is a cross-sectional view of a first embodiment of an electric voltage generator for a fishing lure of the present invention; and FIG. 6 is a cross-sectional view of a second embodiment of electric voltage generator of the present invention.

DESCRIPTION OF THE PREFERRED EMBODIMENT

Reference is made to the drawings for a description of the preferred embodiment of the present invention wherein like reference numbers represent like elements on corresponding views.

Figure 1:
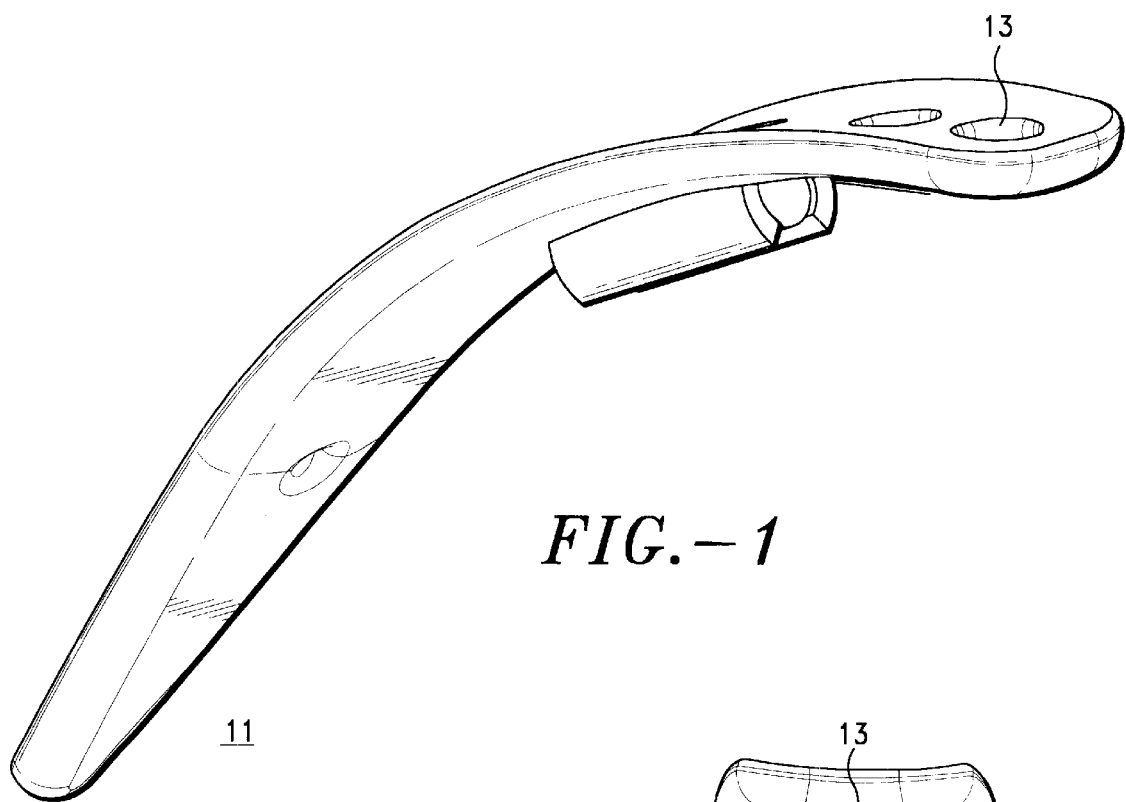
FIG. 1 is a perspective view of the electronic fishing lure of the present invention.
Figure 2:
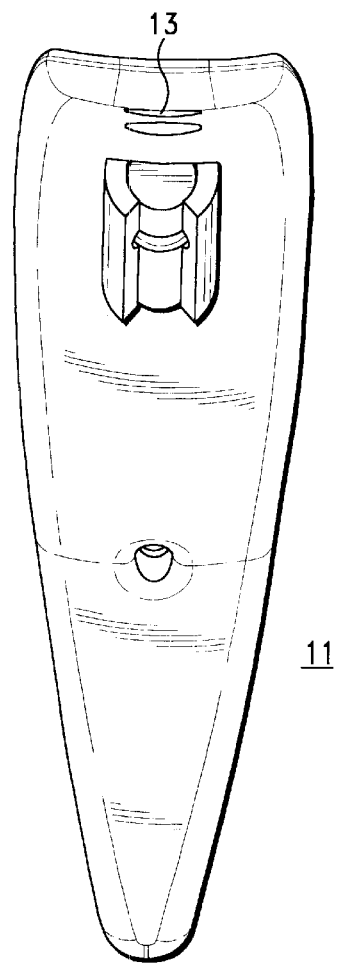
FIG. 2 is a front end elevation view thereof.

FIGS. 1–4 show an electronic fishing lure as contemplated by the present invention. The lure is comprised of a body portion 11 formed for allowing a fishing line to be removably secured thereto, and means are provided for the attachment of least one fishing hook thereto. The fishing line can be secured to an eyelet secured to the front of the lure or to an opening 13 as shown in the drawings formed in the nose or front-end of the lure. One or more hooks can be swivelled on eyelets secured at various preferred positions along the lure body. The body portion is formed to oscillate, partially rotate, or bob in the water while being towed by a fishing line.

An electric voltage generator is formed for attachment to the fishing lure for the purpose of creating an intermittent and alternating electric voltage field in the vicinity of the lure for attracting fish. The voltage field is periodically and randomly generated then it ceases, or it cycles on and off, so that it appears to be intermittent. It also varies in voltage so that it is alternating. However, it does not switch phase like alternating current so the two terms are utilized to describe the effect of the voltage created and the term alternating is not meant to describe AC current.

The voltage generator is comprised of a closed or sealed rigid container 15, which is a preferred embodiment formed to permit movement of a free weight disposed therein along a path. The slide pa or roll path of the weight is preferably disposed to align with the maximum displacement axis of the lure body portion 11 during oscillation thereof when the lure is towed through water. Alternatively, the weight could be free to move in a multiple of restricted directions or in any direction. The weight is unrestrained and free to move in any direction permitted by the container. The container is closed or sealed so that when it is submerged in an aqueous atmosphere, water will not penetrate thereinto to hinder free movement of the weight. The container is made of a rigid material so that it will transmit mechanical shock created therein or aped thereto throughout its structure.

The container 15 has walls formed for containing the free weight 21 and to contain the extent of movement of the weight or prevent movement of the weight beyond certain limits. The walls of the container are also formed to abruptly a terminate longitudinal movements of the weight in the tube. This is preferably accomplished by providing perpendicular walls 19 disposed at right angles to the longitudinal or cylindrical axis of the preferred embodiment of the container. The walls could also be concave inwards or towards the interior of the container when the configuration of the weight insures that it impacts an apex portion of the interior convex portion of the wall.

The end walls 19 of the cylindrical container 15 cannot have a configuration or composition which would cushion the impact of the weight 21 during movement in the container. The purpose and requirement for the configuration of the end walls is to provide a solid surface against which the movable weight can impact and abruptly terminate any movement thereof to thereby transfer the momentum of the weight to the container.

In the preferred embodiment of the voltage generator of the present invention, the tube 15 and the free weight 21 is comprised of a ball. The tube must be made of electrically conducting metal, or a rigid material tube coated with metal, such as by a vapor deposition, and the ball made of a hard dense material such as steel, brass, bronze, or possibly a dense hard ceramic. In the preferred embodiment of the invention, the container is made of an electricity conducting material which is a closed end cylindrical tube 15. If the container is made of stainless-steel, it will resist deformation from abuse to the lure and corrosion from the aqueous atmosphere in which the container will be immersed during its use in association with or use as a fishing lure, either in saltwater or freshwater.

A piezoelectric crystal 23 is secure to the container 15 in such a manner that the impact and momentum of the movable weight 21, when it collides with the container walls 19, is transferred in the form of a mechanical shock to the piezoelectric crystal. The crystal is electrically connected to the surrounding atmosphere which, when the voltage generator is used as a fishing lure, is aqueous. The crystal is either in direct contact with the water or electrical contact is conducted between the crystal and the atmosphere through the container.

When the generator is used in connection with a fishing lure, the container 15 and crystal 23 are secured to the lure body 1 in such a manner that at least a portion of the container or the crystal is in contact with the surrounding atmosphere which is aqueous when the lure is submerged in water. In other words, either a portion of the container, and preferably both ends thereof, for reasons which will be explained hereinafter, is exposed to the surrounding water for electrical contact therewith or the crystal is in direct contact with the water.

In the preferred embodiment of the invention, the crystal 23 is secured into one end of a cylindrical metal container or tube 15 by being force fitted thereinto to establish a firm mechanical and electrical contact with the tube interior walls. In this embodiment, the crystal functions as one of the end walls 19 of the tube for the purpose of abruptly terminating movement of movable weight 21 at that end of the tube. The metal tube functions as the electrical connector between the crystal and surrounding aqueous atmosphere when the crystal is utilized with or as a part of a fishing lure submerged in saltwater or freshwater.

The piezoelectric crystal 23 can also be bonded to the tube 15, and thereby the tube can be made discontinuous in the area of the crystal. As a result of making the tube discontinuous, the effectiveness of the electric field generated by the crystal can be increased. To create this structure, the tube is formed in two separate sections 25, 27 and spaced apart at the point of the bond 29 of the crystal to the two tube sections. The bonding glue at the joint holds the tube sections on the crystal to make the tube discontinuous as shown in FIGS. 5–6. In this manner, the electrical charge at the two opposite ends of the crystal are separated as far apart as possible by the two metal sections of the tube to produce a more effective voltage differential when the crystal generates a voltage.

The free weight 21 is dispose and contained in the container 15 of the voltage generator and is formed to move longitudinally therein. The weight moves in response to movement of the container and as a result intermittently strikes the end walls 19 thereof. In the preferred embodiment of the invention, the weight is captured between the adjacent closed end of the cylinder and crystal 23. When the weight moves in the tube in response to movement thereof, created when the body portion 19 of the lure is towed through water and oscillates, or when the fishing line is manipulated by jerks, the moveable weight strikes the end walls of the tube.

When the free weight 21 slides and strikes either the crystal 23 or the closed end 19 of the container 15 during osillating motion of the lure body 11, or manipulation of the fishing line, the shock of the contact between the weight and the end walls is transmitted to the piezoelectric crystal and an electric voltage is generated by the crystal. As stated previously, the slide path of the weight is preferably disposed to align with the maximum displacement of the body portion of the lure during oscillation thereof when the lure is towed through water. The reason is that this alignment enhances the effectiveness of the weight transferring the maximum amount of momentum to the container with each oscillation and contact of the weight with the ends of the container.

The resulting voltage from the intermittent shocks to the crystal 23 is transmitted to the metal container 15 due to intimate electrical contact of the crystal therewith. The voltage is conducted from the container to the surrounding atmosphere which is the aqueous environment or water medium surrounding the lure. The purpose of creating the electrical current by means of the piezoelectric crystal is for the purpose of creating an intermittent and alternating electric voltage field in the vicinity of the lure for attracting fish.

The electric voltage generator of the present invention standing alone can simply be attached to a fishing line proximate to a fishing hook or lure to achieve its purpose of creating an electric voltage field in the vicinity of the hook or lure. Reference is made to FIG. 5 for such a generator having holes 31 formed in the ends thereof for attachment of the generator to a fishing line while FIG. 6 shows a voltage generator of the type which can be secured to a fishing lure.

The alternating or intermittent electric voltage generated by the piezoelectric crystal 23 is proportional to the shock which the crystal receives as result of the free weight 21 hitting either a closed end 19 of the cylinder 15 or the crystal. Thus, towing the lure faster through water or jigging the fishing line at a more rapid rate will cause the weight to shock the crystal more severely thereby producing a larger voltage spike as result of the increased shock. Thus, the fishermen can manipulate the lure and the associated electric voltage generator, and variable voltage rates can be produced. It therefore can be determined by trial and error which pattern of fishing line manipulation or trolling speed appears to be most attractive to the type of fish sought at the location where the fisherman is fishing for fish.

The present invention also contemplates the new and novel method of attracting fish by creating an alternating voltage intermittently in the vicinity of a fishing lure. It includes the steps of: providing a sealed rigid container having end walls for containing a movable weight and preventing movement of the weight beyond certain limits, the end walls of the tube being formed to abruptly terminate longitudinal movement of the weight at the ends of the tube; securing a piezoelectric crystal to the tube in such a manner that it is electrically connected to the surrounding atmosphere and that physical shock to the tube is transmitted to the crystal; disposing a free weight in the tube whereby the weigh is free to move longitudinally in the tube between the end walls due to external forces applied thereto and as the weight moves in the tube and strikes the ends thereof, the shock of contact between the weight and end walls is transmitted to the piezoelectric crystal and electric voltage is generated thereby and conducted to the surrounding atmosphere; securing the tube proximate to a fishing lure; and moving the tube in a manner as to cause the weight to strike the ends of the tube when fishing whereby electric voltage is conducted to this surrounding water creating an electric voltage field in the vicinity of the lure.

The present invention further contemplates the new and novel method of attracting fish by means of an electronic lure. It includes the steps of: providing a fishing lure body portion having means for removably securing a fishing line thereto and securing at least one fishing hook thereto, the body is formed to oscillate when moved through water by a fishing line; securing a closed rigid metal container to the lure body portion in such a manner that the container is in contact with surrounding aqueous atmosphere when the lure is submerged in the water; forming a slide path in the container for a free weight and limiting movement thereof between the end walls of the container which are formed to abruptly terminate longitudinal movement of the weight in the container; disposing a free weight in the container formed to move freely therein whereby the weight moves in the container in response to movement thereof and intermittently strikes the end walls; securing a piezoelectric crystal in the container in electrical contact with any surrounding aqueous atmosphere whereby when the free weight slides and strikes a wall of the container during oscillating motion of the lure body, an electric voltage is generated by the crystal which is transmitted to the atmosphere surrounding the lure for the purpose of creating an alternating voltage field in the vicinity of the lure for attracting fish; securing a fishing line to the lure body; and towing the lure body through water where fish are expected to congregate.

The method also includes the step of securing the crystal in one end of the container whereby it forms one of the closed ends thereof. It further includes the step of changing the voltage of the electric field in the vicinity of the lure by manipulating the fishing line.

Thus, it will be apparent from the foregoing description of the invention in its preferred form that it will fulfill all of the objects and advantages attributable thereto. While it is illustrated and described in considerable detail herein, the invention is not to be limited to such details as have been set forth except as may be necessitated by the appended claims.

I claim:

1. An electric voltage generator for attachment to fishing lures for attracting fish comprising a sealed rigid container formed for containing a movable free weight and having end walls formed for containing movement of said weight therein between said the end walls and being arranged to abruptly terminate longitudinal movement of said weight in said container, a piezoelectric crystal secured to said container and electrically connected to the surrounding atmosphere, and a free weight disposed and contained in said container and formed to move longitudinally therein whereby as said weight moves in said container in response to movement thereof and strikes said end walls, the resulting shock from any contact between said weight and said end walls is transmitted to said piezoelectric crystal and an electric voltage is generated and conducted to said surrounding atmosphere.

2. The electric voltage generator of claim 1 wherein said container and said weight are comprised of a closed ended cylinder and ball respectively and said cylinder and said ball are made of steel.

3. The electric voltage generator of claim 1 wherein said container is made of electrically conducting material and said piezoelectric crystal is secured internally in one end thereof and forms one end wall for the containment of said weight, said tube being discontinuous in the area of said crystal and forming two separate electrodes secured to said crystal.

4. An electric voltage generator for attachment to fishing lures for attracting fish comprising a sealed steel cylinder formed for containing a movable free weight and having end walls formed for containing the movement of said weight therein between said end walls and being arranged to abruptly terminate longitudinal movement of said weight in said cylinder, a piezoelectric crystal secured internally in one end of said cylinder and forming one end wall thereof for containment of said weight, said tube being discontinuous in the area of said crystal and forming two separate electrodes secured to said crystal and being electrically connected to the surrounding atmosphere, and a dense ball forming a movable free weight disposed and contained in said cylinder and formed to move longitudinally therein whereby as said ball moves in said cylinder in response to movement thereof and strikes said end walls, the resulting shock from any contact between said weight and said end walls is transmitted to said piezoelectric crystal whereby an electric voltage is generated and conducted to said surrounding atmosphere.

5. An electronic fishing lure comprising a lure body portion formed for allowing a fishing line to be removably secured thereto and for the attachment of at least one fishing hook thereto, said body portion being formed to oscillate while being towed through water by a fishing line, a closed rigid container secured to said lure body portion in such a manner that said container is in contact with the surrounding aqueous atmosphere when said lure is submerged in water, said container forming a slide path for a free weight and having end walls which are formed to abruptly terminate longitudinal movement of said weight in said container, a free weight disposed in said container and formed to move freely therein whereby as said weight moves in response to movement of said lure body, said weight strikes said end walls of said container, and a piezoelectric crystal secured to said container and disposed in electrical contact with the surrounding atmosphere whereby when said free weight slides and strikes said ends of said container during oscillating motion of said lure body, an electric current is generated by said crystal which is transmitted to said cylinder and therefrom to the water medium surrounding said lure for the purpose of creating an alternating electric field in the vicinity of said lure for attracting fish.

6. The lure of claim 5 wherein the slide path of said weight is disposed to align with the maximum displacement motion of said body portion during oscillation thereof while being towed through water.

7. The lure of claim 5 wherein said container and said weight are comprised of a cylinder and ball respectively which are made of steel.

8. The lure of claim 5 wherein said container is made of electrically conducting metal and said piezoelectric crystal is secured internally in one end thereof and forms one end wall for the containment of said weight, said container being discontinuous in the area of said crystal and forming two separate electrodes secured to said crystal.

9. A method of attracting fish by creating an alternating electric voltage in the vicinity of a fishing lure comprising providing an electrically conductive sealed rigid container having walls for containing a movable free weight and preventing movement of said weight beyond certain limits, said walls being formed to abruptly terminate longitudinal movement of said weight in said container, securing a piezoelectric crystal to said container in such a manner that it is electrically connected to the surrounding atmosphere and the physical shock to said container is transmitted to said crystal, disposing a free weight in said container whereby said weight is free to move in said container between said walls due to external forces applied thereto and as said weight moves in said container, and strikes said walls thereof, the shock of the contact between said weight and said walls is transmitted to said piezoelectric crystal and an electric voltage is generated thereby and conducted to the surrounding atmosphere, securing said container proximate to a fishing lure, and moving said container to cause said weight to strike said walls of said container when fishing whereby an electric voltage is generated by said crystal and conducted to the water creating an electric field in the vicinity of said lure.

10. The method of claim 9 wherein the voltage of the electric field in the vicinity of said lure is changed by manipulating said fishing line.

11. A method for attracting fish by an electronic lure comprising provide a fishing lure body portion having means for removably securing a fishing line thereto and securing at least one fishing hook thereto, said body being formed to oscillate when moved through water by a fishing line, securing a closed end rigid metal container o said lure body portion in such a manner that said container is in contact with the surrounding aqueous atmosphere when said lure is submerged in water, forming a slide path in said container for a free weight to move therein in response to movement of said container, said slide path limiting movement of said weight between end walls of said container which are formed to abruptly terminate movement of said weight in said container, disposing a free weight in said container formed to move freely therein whereby said weight moves in said container in response to movement thereof and intermittently strikes said watts thereof, securing a piezoelectric crystal to said container in electrical contact with any surrounding aqueous atmosphere whereby when said free height strikes said walls of said container during oscillating motion of said lure body, an electric voltage is generated by said crystal which is transmitted to said surrounding atmosphere of said lure for the purpose of creating an alternating electric field in the vicinity of said lure for attracting fish, securing a fishing line to said lure body, and towing said lure body through water where fish are expected to congregate.

12. The method of claim 11 including securing said crystal at one end of said slide path in said container whereby said crystal forms one of said ends of said container.

* * * * *